Feb. 24, 1959 H. M. GEYER 2,874,579
HIGH TEMPERATURE HYDRAULIC ACTUATOR
Filed Feb. 21, 1956 2 Sheets-Sheet 1
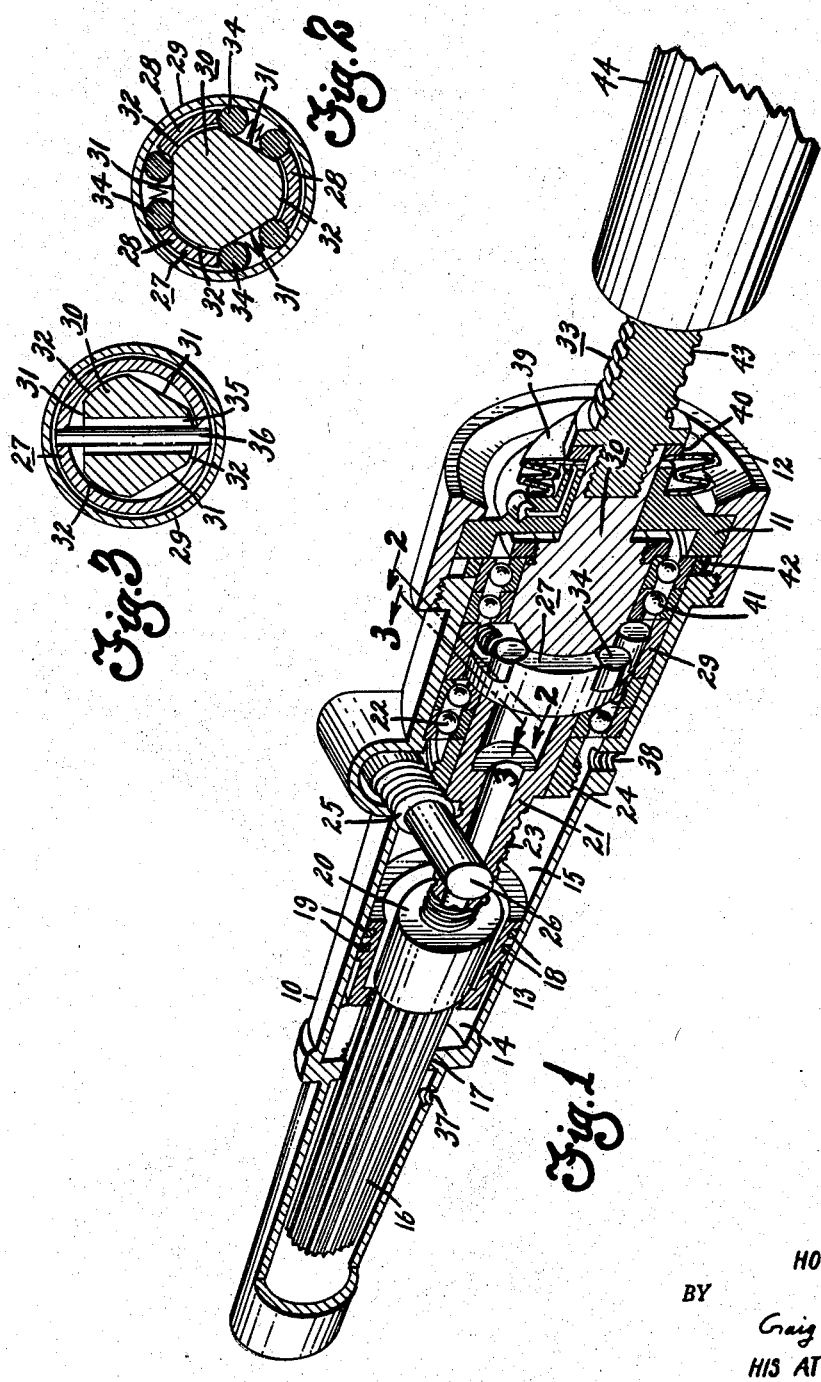
INVENTOR.
HOWARD M. GEYER
BY
Craig V. Morton
HIS ATTORNEY Feb. 24, 1959                H. M. GEYER                2,874,579
              HIGH TEMPERATURE HYDRAULIC ACTUATOR
Filed Feb. 21, 1956                                 2 Sheets-Sheet 2
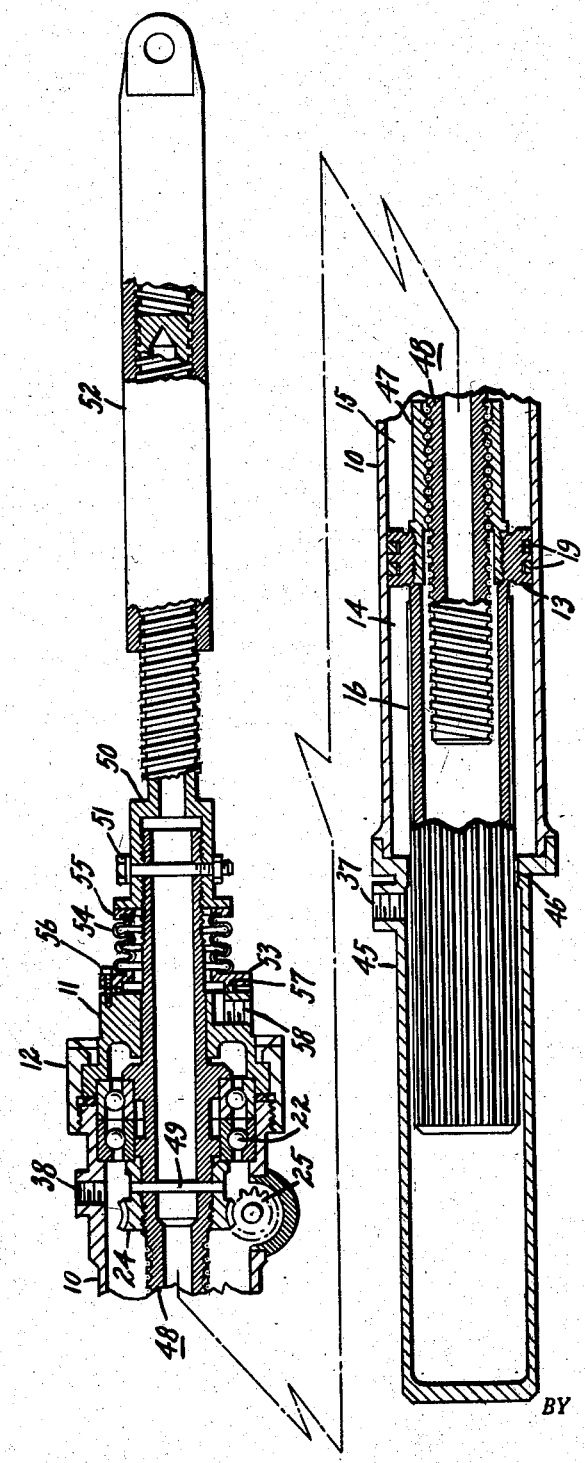
INVENTOR.
HOWARD M. GEYER
BY Craig V. Morton
HIS ATTORNEY

United States Patent Office 2,874,579
Patented Feb. 24, 1959

2,874,579

HIGH TEMPERATURE HYDRAULIC ACTUATOR

Howard M. Geyer, Dayton, Ohio, assignor to General Motors Corporation, Detroit, Mich., a corporation of Delaware Application February 21, 1956, Serial No. 566,862

13 Claims. (Cl. 74—57)

This invention pertains to fluid pressure operated actuators, and particularly to a high temperature hydraulic actuator assembly.

Heretofore, it has been conventional practice in hydraulic actuator installations to maintain a movable load device in adjusted position by trapping oil within the actuator cylinder, i. e. supporting the load by an oil column. However, it has been observed that oil is slightly compressible at pressures above 1000 p. s. i. and, hence, the load device cannot be maintained in its adjusted position by an oil column under these conditions. Moreover, where actuators are subject to high ambient temperatures, such as those in the vicinity of a gas turbine installation, organic sealing materials, i. e. rubber, etc., deteriorate very rapidly. The present invention relates to a high temperature actuator assembly having metallic sealing means and including structural members for maintaining a movable load device in its adjusted position. Accordingly, among my objects are the provision of a high temperature actuator assembly including metallic sealing means; the further provision of a fluid pressure operated actuator including structural means for supporting a load; and the still further provision of an actuator assembly having a cylinder, a piston and an output member including one-way driving means between the piston and the output member. The term "one-way driving means," as used in the specification and claims, should be construed as denoting an arrangement wherein movement of the piston can position the output member in either direction, whereas the output member due to loading thereof cannot move the piston in either direction.

The aforementioned and other objects are accomplished in the present invention by incorporating means in the actuator whereby the actuator can move the load device, but the load device cannot move the actuator operating member. Specifically, in one embodiment the actuator includes a cylinder having disposed therein, a reciprocable piston with opposed equal areas and a rotatable screw shaft, which is connected to the piston through a ball-nut coupling. Accordingly, piston reciprocation is dependent upon and effects rotation of the screw shaft. The internal screw shaft is connected through a "no-back" coupling to an external screw shaft which is coupled to a reciprocable output member, or nut, by a plurality of circulating balls. The "no-back" prevents rotation of the external and internal screw shafts in either direction by loads imposed upon the output member, but permits rotation of the screw shaft in both directions upon piston movement due to the application of fluid under pressure.

In the second embodiment, the actuator includes a cylinder having disposed therein a piston and a reversible screw shaft threadedly connected to the piston carried ball-nut. The internal screw is mechanically connected to an external Acme screw of such a lead to make it irreversible, which is threadedly connected to an output member, or nut. Since the load screw is irreversible, the load acting on the output member cannot move the piston, while the piston can move the output member in either direction due to the application of fluid under pressure.

In both embodiments, the piston includes a rod having a straight spline connection with the cylinder whereby the piston cannot rotate relative to the cylinder. Moreover, the piston carries metallic rings for sealingly engaging the cylinder walls and divides the cylinder into extend and retract chambers. On extend end or where rotating screw shaft enters the cylinder, a closely fitted bushing is used to limit the leakage to a small amount. The oil passing past this bushing is carried off to the oil reservoir through a port. In addition, metallic bellows and rings are used for effecting a low pressure seal between the stationary cylinder and the rotatable screw shafts.

Further objects and advantages of the present invention will be apparent from the following description, reference being had to the accompanying drawings wherein preferred embodiments of the present invention are clearly shown.

In the drawings:

Fig. 1 is a perspective view, partly in section and partly in elevation, of one embodiment of an actuator constructed according to this invention.

Figs. 2 and 3 are sectional views taken along lines 2—2 and 3—3, respectively, of Fig. 1.

Fig. 4 is a view, partly in section and partly in elevation, of a second embodiment of an actuator constructed according to this invention.

With particular reference to Figs. 1 through 3, in the preferred embodiment, the actuator comprises a cylinder 10 having a head cap 11 attached to the open end thereof by a threaded collar 12. A reciprocable piston 13 is disposed within the cylinder 10, the piston 13 dividing the cylinder 10 into a retract chamber 14 and an extend chamber 15. The piston is threadedly connected to a longitudinally splined hollow rod 16, the spline teeth of which mate with complementary spline teeth formed on an internal cylinder shoulder 17 whereby the piston 13 is restrained against rotation relative to the cylinder. However, the piston 13 is free to move lineally relative to the cylinder 10, and by reason of the space between the splined teeth on the rod 16 and the shoulder 17, the piston presents surfaces of equal area to the retract chamber 14 and the extend chamber 15. The head of the piston 13 is formed with a pair of annular grooves 18 which receive metallic piston rings 19 that sealingly engage the inner wall of the cylinder 10. In addition, the rod 16 is attached to a nut 20 having an internal spiral groove of semi-circular cross section, which forms a component of the well known ball-screw and nut coupling.

A rotatable screw shaft 21 is rotatably journaled in the cylinder 10 by means of ball bearings 22. The screw shaft 21 is formed with a complementary spiral groove 23 of semi-circular cross section and is coupled to the nut 20 by means of a plurality of circulating balls, not shown. Accordingly, movement of the piston 13 is dependent upon and effects rotation of the screw shaft 21. The screw shaft 21 also has suitably secured thereto a worm gear 24, which meshes with a worm 25 attached to a synchronizing shaft 26 that extends without the actuator cylinder 10. The synchronizing shaft 26 may be connected through worm gearing to the screw shaft, or shafts, of adjacent like actuators to assure mechanical synchronization of a plurality of actuators.

With particular reference to Figs. 2 and 3, the hub end of the screw shaft 21 forms a part of a "no-back" coupling generally designated by the numeral 27. Specifically, the hub of the screw shaft 21 is formed with three circumferentially spaced axially extending fingers 28 and, thus, constitutes the fingered member of the "no-back" coupling 27. The coupling 27 also includes a stationary outer ring, or annulus, 29, which is attached to the cylinder 10, a cam member 30 having three flats 31 separated by three arcuate surfaces 32. The cam 30 is connected by means of a threaded coupling to an external screw shaft 33. The lead of the external screw shaft 33 is opposite to that of the internal screw shaft 21, i. e. the internal screw shaft has a left-hand thread and the external screw shaft has a right-hand thread. The "no-back" coupling 27 also includes three sets of spring-biased rollers 34, which overlie the flats 31 on the cam 30.

The "no-back" coupling 27 constitutes one-way driving means between the internal screw shaft 21 and the external screw shaft 33. More particularly, while rotation of the screw shaft 21, due to movement of the piston 13, will cause rotation of the screw shaft 33, the screw shaft 33 cannot be rotated by an applied load. In order to release the "no-back," i. e. move the rollers 34 out of wedging engagement between the cam 30 and the outer ring 29, the fingers 28 must be moved angularly relative to the cam member 30. To accomplish this result, the cam member 30, as shown in Fig. 3, has a diametrical passage 35 therethrough, which is larger than a cross pin 36 carried by the screw shaft 21 which extends therethrough. Thus, when the lost motion between the pin 36 and the passage 35 has been taken up, the rollers 34 will be displaced so as to unlock the coupling and permit rotation of the cam member 30 relative to the ring 29. It is pointed out that the "no-back" coupling can only be released by rotation of the screw shaft 21 as effected by the piston 13. Thus, the load applied to the external screw shaft 33 is supported by the actuator structure rather than an oil column.

The actuator cylinder 10 is formed with a retract port 37 and an extend port 38 which communicate, respectively, with the retract and extend chambers. Moreover, all of the seals between the relatively movable parts in the instant actuator are metallic since the actuator is designed for high temperature operation. Thus, the hub portion of the cam 30 is engaged by the sealing surface of the end cap 11 through which it extends. Moreover, the metallic bellows 39 is disposed between the cap 11 and a rotary low pressure metallic sealing ring 40 attached to the external screw shaft 33. As seen in Fig. 1, the cam member 30 is rotatably journaled in the cylinder by a ball bearing means 41, and a metallic sealing ring 42 is interposed between the cap 11 and the end of the cylinder 10.

The external screw shaft 33 is also formed with a spiral groove 43 of semi-circular cross section. The screw shaft 33 is connected to a lineally movable output member 44, which may be attached to any suitable load device, not shown. In the instant actuator, the output member 44 comprises a nut, which is connected to the screw shaft 33 through a plurality of circulating balls, not shown. When fluid under pressure is admitted to the extend chamber 15 through the port 38, while the retract chamber 14 is connected to drain through the port 37, the piston 13 will move to the left, as viewed in Fig. 1, thereby imparting rotation to the screw shaft 21, which releases the "no-back" coupling 27 and thereby permits rotation of the screw shaft 33 by the screw shaft 21 through the pin 36 so that the nut, or output member, 44 will move lineally to the right, as viewed in Fig. 1. When the output member 44 has been moved to the desired position, it will be maintained in this position since the "no-back" coupling 27 will prevent rotation of the screw shaft 33 in both directions.

With particular reference to Fig. 4, the second embodiment of an actuator constructed according to this invention will be described. In both embodiments, similar reference numerals denote similar parts, and, thus, in the second embodiment, the actuator cylinder 10, likewise, has disposed therein a reciprocable piston 13 and has one end closed by a cap 11, which is retained by a collar 12. The piston 13 is formed integrally with the longitudinally splined piston rod 16 which is restrained against rotation due to engagement with the spline teeth 46 formed on a piston rod housing 45, which is welded to the cylinder 10. However, in the second embodiment, the piston 13, carrying metallic piston rings 19, is connected to ball nut 47, which threadedly engages a ball screw 48. The piston 13, likewise, divides the cylinder 10 into a retract chamber 14 and an extend chamber 15 and presents equal opposed areas to these chambers. The retract chamber 14 communicates with retract port 37 and the extend chamber communicates with extend port 38.

The screw shaft 48 is connected by means of a cross pin 49 to synchronizing worm gear 24 which meshes with worm 25. Moreover, the screw shaft 48 is rotatably journaled in the cylinder 10 by ball bearing means 22. In addition, the screw shaft 48 is threadedly connected to an external irreversible Acme screw shaft 50, and, in addition, the screw shafts are interconnected by a cross bolt 51. The external screw shaft 50 threadedly engages an output member 52 which comprises a nut whereby rotation of the screw shaft 50 will impart lineal movement to the output member. The seal between the cylinder 10 and the screw shaft 50 includes a close fitted bushing 11 and a metallic sealing ring 53, a metallic bellows 54 and a metallic sealing ring 55. The metallic sealing ring 53 is connected to the cap 11 by bolts, such as indicated by numeral 56, a metallic gasket 57 being interposed therebetween. The sealing ring 55 is suitably attached to the screw shaft 50. In addition, the interior of the bellows 54 is connected to a drain port 58.

Operation of the actuator depicted in Fig. 4 is identical to that of the actuator shown in Figs. 1 through 3. In other words, when the retract chamber 14 is pressurized and the extend chamber 15 is connected to drain, the piston 13 will move to the right causing rotation of the screw shafts 48 and 50, whereby the output member 52 will move to the left. Conversely, when the extend chamber 15 is pressurized and the retract chamber 14 is connected to drain, the piston 13 will move to the left causing the screw shafts 48 and 50 to rotate in the opposite direction so that the output member 52 will move to the right. When the output member has been moved to the desired position, any load applied thereto will not change its position since the screw 50 is irreversible.

From the foregoing, it is apparent that the present invention relates to an actuator which is particularly designed for operation at high ambient temperatures. Moreover, in the instant actuators, the load is not supported by an oil column, but, conversely, is supported by the actuator structure itself due to the one-way driving means between the internal and external screw shafts, or rotatable elements.

While the embodiments of the present invention as herein disclosed, constitute preferred forms, it is to be understood that other forms might be adopted.

What is claimed is as follows:

1. An actuator assembly including, a cylinder having a reciprocable piston therein, said piston having operative connection with said cylinder so as to prevent relative rotation therebetween, an internal rotatable element in said cylinder and operatively connected to said piston so as to rotate upon piston movement, an external rotatable element operatively connected to and coaxial with said internal rotatable element so as to rotate therewith, and an output member operatively connected to said external element so as to move lineally upon rotation of said external element.

2. An actuator assembly including, a cylinder, a reciprocable piston disposed in said cylinder, said piston dividing said cylinder into two chambers and having opposed equal areas, an internal rotatable element in said cylinder and operatively connected to said piston such that piston movement is dependent upon and effects rotation of said internal element, an external rotatable element operatively connected to and coaxial with said internal element so as to rotate therewith, and an output member operatively connected to said external element so as to move lineally upon rotation of said external element.

3. A high temperature actuator assembly including, a cylinder having a reciprocable piston therein, an internal rotatable element in said cylinder and operatively connected to said piston so as to rotate upon piston movement, an external rotatable element operatively connected to and coaxial with said internal rotatable element so as to rotate therewith, an output member operatively connected to said external element so as to move lineally upon rotation of said external element, and metallic sealing means disposed between and engaging said cylinder and said external rotatable element.

4. An actuator assembly including, a cylinder having a reciprocable piston therein, a reversible screw shaft rotatably journaled within said cylinder and operatively connected to said piston so as to rotate upon piston movement, an external irreversible screw shaft operatively connected to said internal screw shaft so as to rotate therewith, and an output member threadedly connected with said external screw shaft so as to move lineally upon rotation of said external screw shaft, the construction and arrangement being such that a load applied to said output member cannot effect rotation of said screw shafts or movement of said piston.

5. An actuator assembly including, a cylinder having a reciprocable piston therein, said piston having operative connection with said cylinder to prevent relative rotation therebetween, an internal rotatable element in said cylinder and operatively connected to said piston so as to rotate upon piston movement, an external rotatable element operatively connected to said internal rotatable element so as to rotate therewith, an output member operatively connected to said external element so as to move lineally upon rotation of said external element, and a synchronizing shaft operatively connected to said internal element for synchronizing movement of the actuator assembly with other like actuator assemblies.

6. An actuator assembly including, a cylinder having a reciprocable piston therein, an internal rotatable element in said cylinder operatively connected to said piston so as to rotate upon piston movement, an external rotatable element, and one-way driving means interconnecting said internal and external rotatable elements whereby only said piston can effect rotation of said external element.

7. The actuator assembly set forth in claim 6 wherein said one-way driving means comprises a stationary ring attached to said cylinder, a cam member attached to said external rotatable element and coaxially arranged within said ring member, a plurality of spring biased rollers disposed between said cam and said ring member, and a fingered annulus connected to said internal element and disposed coaxially between said cam member and said ring member, said fingered annulus having a lost motion driving connection with said cam member.

8. A high temperature actuator assembly including, a cylinder, a reciprocable piston disposed in said cylinder and having metallic rings for sealingly engaging the cylinder and dividing said cylinder into a pair of expansible chambers, an internal rotatable element disposed within said cylinder and operatively connected with said piston so as to rotate upon piston movement, an external rotatable element operatively connected to the internal rotatable element so as to rotate therewith, and a metallic bellows seal between the cylinder and the external rotatable element.

9. A high temperature actuator assembly including, a cylinder, a reciprocable piston disposed in said cylinder having metallic rings for sealingly engaging the cylinder and dividing said cylinder into a pair of expansible chambers, an external rotatable element, means operatively interconnecting said rotatable element and said piston, and metallic sealing means disposed between and engaging said cylinder and said rotatable element.

10. A fluid pressure operated actuator including, a cylinder, a reciprocable piston disposed in said cylinder, said piston dividing said cylinder into opposed expansible chambers and presenting equal areas to said chambers, an internal rotatable element disposed in said cylinder and operatively connected to said piston so as to rotate upon piston movement, said piston being capable of fluid pressure actuation in both directions, and an external rotatable element operatively connected to and coaxial with said internal rotatable element.

11. A fluid pressure operated actuator including, a cylinder, a reciprocable piston disposed in said cylinder capable of fluid pressure actuation in both directions, said piston dividing said cylinder into opposed expansible chambers and presenting equal areas to said chambers, a nut carried by said piston for movement therewith, an internal screw shaft rotatably supported in said cylinder and operatively connected with said nut such that piston movement is dependent upon and effects rotation of said internal screw shaft, an external screw shaft operatively connected with said internal screw shaft so as to rotate therewith, and a reciprocable output member operatively connected to said external screw shaft so as to move lineally upon rotation of said external screw shaft.

12. A fluid pressure operated actuator including, a cylinder, a reciprocable piston disposed in said cylinder and dividing said cylinder into opposed expansible chambers, a rod connected with said piston and disposed wholly within said cylinder, said rod having a straight spline connection with said cylinder so as to prevent rotation between said piston and said cylinder, a nut carried by said piston for movement therewith, an internal screw shaft rotatably supported in said cylinder and operatively connected with said nut so that piston movement is dependent upon and effects rotation of said internal screw shaft, an external screw shaft operatively connected to said internal screw shaft so as to rotate therewith, and a reciprocable output member operatively connected with said external screw shaft so as to move lineally upon rotation of said external screw shaft.

13. An actuator assembly including, a cylinder, a reciprocable piston disposed in said cylinder, an internal rotatable element disposed in said cylinder and operatively connected to said piston so as to rotate upon piston movement, an external rotatable element, one-way driving means interconnecting said internal and external rotatable elements comprising a stationary ring attached to said cylinder, a cam member attached to said external rotatable element and coaxially arranged within said ring member, a plurality of spring biased rollers disposed between said cam and said ring member, a fingered annulus connected to said internal rotatable element and disposed coaxially between the cam member and the ring member, said cam member having a diametrical passage therethrough, and a cross pin attached to said fingered annulus and extending through said diametrical passage in said cam member, the cross-sectional area of said diametrical passage being greater than the cross-sectional area of said pin so as to form a lost motion driving connection between said fingered annulus and said cam member.

References Cited in the file of this patent

UNITED STATES PATENTS

| | | |
|---|---|---|
| 1,138,892 | Roberts | May 11, 1915 |
| 1,239,862 | Baird | Sept. 11, 1917 |
| 1,990,978 | Child | Feb. 12, 1935 |
| 2,597,798 | Houplain | May 20, 1952 |
| 2,732,723 | Crofton | Jan. 31, 1956 |
| 2,784,611 | Davis | Mar. 12, 1957 |